(12) United States Patent
Hatakeyama

(10) Patent No.: US 8,185,748 B2
(45) Date of Patent: May 22, 2012

(54) METHODS AND APPARATUS FOR FACILITATING A SECURE PROCESSOR FUNCTIONAL TRANSITION

(75) Inventor: Akiyuki Hatakeyama, Kanagawa (JP)

(73) Assignee: Sony Computer Entertainment Inc., Tokyo (JP)

( * ) Notice: Subject to any disclaimer, the term of this patent is extended or adjusted under 35 U.S.C. 154(b) by 1787 days.

(21) Appl. No.: 11/347,067

(22) Filed: Feb. 3, 2006

(65) Prior Publication Data
US 2006/0177068 A1    Aug. 10, 2006

Related U.S. Application Data

(60) Provisional application No. 60/650,491, filed on Feb. 7, 2005.

(51) Int. Cl.
*G06F 21/00* (2006.01)
(52) U.S. Cl. .................................. 713/189; 713/190
(58) Field of Classification Search .................. None
See application file for complete search history.

(56) References Cited

U.S. PATENT DOCUMENTS

| | | | |
|---|---|---|---|
| 5,379,342 A | 1/1995 | Arnold et al. | |
| 5,491,788 A | 2/1996 | Cepulis et al. | |
| 5,615,263 A | 3/1997 | Takahashi | |
| 5,937,063 A | 8/1999 | Davis | |
| 6,052,780 A * | 4/2000 | Glover | 713/193 |
| 6,185,678 B1 | 2/2001 | Arbaugh et al. | |
| 6,526,491 B2 | 2/2003 | Suzuoki et al. | |
| 6,938,164 B1 | 8/2005 | England | |
| 7,093,147 B2 * | 8/2006 | Farkas et al. | 713/320 |
| 7,217,310 B2 | 5/2007 | Yahagi | |
| 7,219,369 B2 | 5/2007 | Hashimoto | |
| 7,530,114 B2 | 5/2009 | Yamada | |
| 2002/0073316 A1 | 6/2002 | Collins et al. | |
| 2003/0014653 A1 | 1/2003 | Moller et al. | |
| 2003/0028794 A1 | 2/2003 | Miller et al. | |
| 2003/0163723 A1 | 8/2003 | Kozuch et al. | |
| 2003/0182571 A1 | 9/2003 | Hashimoto | |
| 2004/0003321 A1 * | 1/2004 | Glew et al. | 714/27 |

(Continued)

FOREIGN PATENT DOCUMENTS

EP    0 606 771 A2    7/1994

(Continued)

OTHER PUBLICATIONS

Office Action for related U.S. Appl. No. 11/347,050, Feb. 1, 2010.

(Continued)

*Primary Examiner* — Nasser Moazzami
*Assistant Examiner* — Carlton Johnson
(74) *Attorney, Agent, or Firm* — Matthew B. Dernier, Esq.; Gibson & Dernier LLP

(57) ABSTRACT

A processor and associated local memory are capable of operative connection to a main memory such that data may be read from the main memory for use in the local memory, and the processor is operable to carry out actions, including: entering a secure mode of operation where externally initiated requests to read data from or write data into the processor are not serviced but internally initiated data transfers are serviced; reading a decryption program from a storage medium into the local memory of the processor; reading an encrypted authentication program into the local memory of the processor; decrypting the encrypted authentication program using a decryption program; and transitioning functionality of the processor from the decryption program to the authentication program.

33 Claims, 5 Drawing Sheets

U.S. PATENT DOCUMENTS

| | | | |
|---|---|---|---|
| 2004/0064457 A1 | 4/2004 | Zimmer et al. | |
| 2004/0083375 A1 | 4/2004 | Foster et al. | |
| 2004/0158742 A1 | 8/2004 | Srinivasan et al. | |
| 2004/0168201 A1 | 8/2004 | Tada et al. | |
| 2005/0025390 A1 | 2/2005 | Tsujii | |
| 2005/0071656 A1* | 3/2005 | Klein et al. | 713/193 |
| 2005/0166264 A1 | 7/2005 | Yamada | |
| 2005/0166709 A1 | 8/2005 | Yahagi | |
| 2005/0235166 A1 | 10/2005 | England | |

FOREIGN PATENT DOCUMENTS

| | | |
|---|---|---|
| JP | 09-282155 A | 10/1997 |
| JP | 2002-169787 A | 6/2002 |
| JP | 2002-287978 A | 10/2002 |
| JP | 2003-280989 A | 10/2003 |
| WO | 03-058411 | 7/2003 |
| WO | WO 03/085497 A2 | 10/2003 |
| WO | 2004-099981 A | 4/2004 |
| WO | WO 2004/072787 A2 | 8/2004 |

OTHER PUBLICATIONS

Office Action for U.S. Appl. No. 11/347,069, May 27, 2009.
Office Action for U.S. Appl. No. 11/347,050, Jun. 24, 2009.
ISR and Written Opinion, Jul. 17, 2006.
Office Action for related Japanese Patent application No. 2006-024770, Jul. 14, 2009.
Office Action for related Japanese Patent application No. 2006-024773, Jul. 14, 2009.
Office Action for related Japanese Patent application No. 2006-024771, Aug. 25, 2009.
Office Action for related U.S. Appl. No. 11/347,069, Dec. 16, 2009.
Office Action for corresponding Japanese application JP 2006-024773, dated Jun. 1, 2010.
Office Action for related U.S. Appl. No. 11/347,069, Oct. 14, 2010.
Office Action for related U.S. Appl. No. 11/347,069, Feb. 28, 2011.
Office Action (Examiner's Answer) for related U.S. Appl. No. 11/347,069, Sep. 7, 2011.
International Search Report and Written Opinion based on PCT/JP2006/302095, dated Jul. 19, 2006.
Yee, Bennet; "Using Secure Coprocessors;" Thesis submitted to the School of Computer Science for the Degree of Doctor of Philosophy, XP002387974, May 1994; 94 pgs.
International Search Report and Written Opinion based on PCT/JP2006/302107, dated Aug. 4, 2006.

* cited by examiner

METHODS AND APPARATUS FOR FACILITATING A SECURE PROCESSOR FUNCTIONAL TRANSITION

CROSS REFERENCE TO RELATED APPLICATIONS

This application claims the benefit of U.S. Provisional Patent Application No. 60/650,491, filed Feb. 7, 2005, entitled "Methods And Apparatus For Facilitating A Secure Processor Functional Transition," the entire disclosure of which is hereby incorporated by reference. This application is related to U.S. patent application Ser. No. 60/650,755, filed Feb. 7, 2005, entitled "Methods And Apparatus For A Secure Session Between A Processor And An External Device," the entire disclosure of which is hereby incorporated by reference.

BACKGROUND OF THE INVENTION

The present invention relates to methods and apparatus for facilitating a transition from a trusted decryption function to a content authentication function in a secure processing environment, which may include a multi-processing capability.

In recent years, there has been an insatiable desire for faster computer processing data throughputs because cutting-edge computer applications are becoming more and more complex, and are placing ever increasing demands on processing systems. Graphics applications are among those that place the highest demands on a processing system because they require such vast numbers of data accesses, data computations, and data manipulations in relatively short periods of time to achieve desirable visual results. Real-time, multimedia applications also place a high demand on processing system; indeed, they require extremely fast processing speeds, such as many thousands of megabits of data per second.

While some processing systems employ a single processor to achieve fast processing speeds, others are implemented utilizing multi-processor architectures. In multi-processor systems, a plurality of sub-processors can operate in parallel (or at least in concert) to achieve desired processing results. It has also been contemplated to employ a modular structure in a multi-processing system, where the computing modules are accessible over a broadband network (such as the Internet) and the computing modules may be shared among many users. Details regarding this modular structure may be found in U.S. Pat. No. 6,526,491, the entire disclosure of which is hereby incorporated by reference.

A problem arises, however, when a processing system is used over a network or is part of a shared resource. In particular, the processor and its associated software (such as application programs) are subject to outside influences such as intentional hacking and the like. Another problem involves the unauthorized or outright malicious effects that may be introduced by software that is not authenticated in some way prior to execution. Unfortunately, the conventional process of executing software applications (or other types of digital content) prescribes reading the software from a memory and executing same using a processor. Even if the processing system in which the software is executed employs some type of security feature, the software might be tampered with or may not be authorized for execution in the first place. Thus, any later invoked security measures cannot be fully trusted and may be usurped.

Accordingly, there are needs in the art for new methods and apparatus for providing security features to authenticate digital content, such as providing a transition from a trusted decryption function to a content authentication function in a secure processing environment.

SUMMARY OF THE INVENTION

In accordance with one or more aspects of the present invention, it is desirable to establish a secure processing environment. This may involve triggering a state in which no externally-initiated data access request into the processor will be responded to. In other words, the secure processor will not respond to any outside request for data (e.g., a request to read contents on a local memory or registers). Thus, when the processor enters a secure mode, it creates a trusted environment in which to launch further security measures, such as authentication of software applications and content.

Preferably, trusted decryption code (and a trusted decryption key) is stored in a secure memory (e.g., a flash ROM) that is associated with a particular processor. The trusted decryption code and decryption key are preferably only available from the flash ROM when the processor has entered a secure mode. This decryption capability is preferably hardware-implemented (e.g., software that is burned into the flash ROM or any other suitable hardware device). Once the trusted decryption code is invoked, it may be used to decrypt a public key authentication program (which was encrypted using the trusted key) and stored in a system memory (outside the secure processing environment). The public key authentication program may be used to decrypt and authenticate other application programs and content.

Once the trusted decryption code has served it purpose, the function of the secure processor preferably transitions to the public key authentication program. In an alternative embodiment, the secure processor may pass the authenticated application program and/or data to another processor (which may or may not be secure) in a multi-processor system.

By way of example, the public key authentication program may be operable to decrypt and authenticate an application program and/or data (content) that has been encrypted using a trusted key (e.g., a private key of a private/public key pair). The secure processor may use a public key (e.g., the public key of the private/public key pair) to decrypt and verify the application program and/or data. The application program and/or data may also be signed by an electronic signature (e.g., a hash result), which may also be verified by the public key authentication program running the hash algorithm and cross-checking the result.

It is noted that as used herein, the term "data" is broadly construed to include any type of program code, application software, system level software, any type of data, a data stream, etc.

Once the data have been decrypted and verified, the secure processor may execute and/or otherwise utilize the data in a secure fashion without concern about hacking or other security violations. Without such verification, however, any subsequent program execution and/or data manipulation cannot be fully trusted.

In accordance with one of more embodiments of the present invention, methods and apparatus provide for employing a processor and associated local memory to achieve desirable results, where the processor is capable of operative connection to a main memory such that data may be read from the main memory for use in the local memory.

The methods and apparatus preferably provide for: entering a secure mode of operation where externally initiated requests to read data from or write data into the processor are not serviced but internally initiated data transfers are serviced; reading a decryption program from a storage medium into the local memory of the processor; reading an encrypted authentication program into the local memory of the processor; decrypting the encrypted authentication program using a decryption program; and transitioning functionality of the processor from the decryption program to the authentication program.

The storage medium containing the decryption program is preferably secure such that the decryption program may not be tampered with by external software manipulation.

The authenticity of the authentication program may be verified prior to transitioning functionality of the processor. The step of verifying the authenticity of the authentication program may include executing a hash function on the decrypted authentication program to produce a hash result and comparing the hash result with a predetermined hash value.

In accordance with one or more further embodiments of the present invention, a multi-processing system may be employed and after the authentication program is verified, the authentication program may be transferred from the at least one processor to another processor of the system.

Irrespective of whether a single processor or a multi-processor system is employed, the encrypted content is preferably read from the system memory into the local memory, the content having been encrypted using a private key of a private/public key pair; and the authentication program is preferably used to authenticate the content. The encrypted content may be decrypted using the authentication program and the public key of the private/public key pair. The authenticity of the content may be verified by executing a hash function thereon to produce a hash result and comparing the hash result with a predetermined hash value.

Thereafter, the functionality of the processor may be transitioned from the authentication program to the content if the content is authentic.

Other aspects, features, advantages, etc. will become apparent to one skilled in the art when the description of the invention herein is taken in conjunction with the accompanying drawings.

BRIEF DESCRIPTION OF THE DRAWINGS

For the purposes of illustrating the various aspects of the invention, there are shown in the drawings forms that are presently preferred, it being understood, however, that the invention is not limited to the precise arrangements and instrumentalities shown.

DETAILED DESCRIPTION OF THE PRESENT INVENTION

Figure 1:
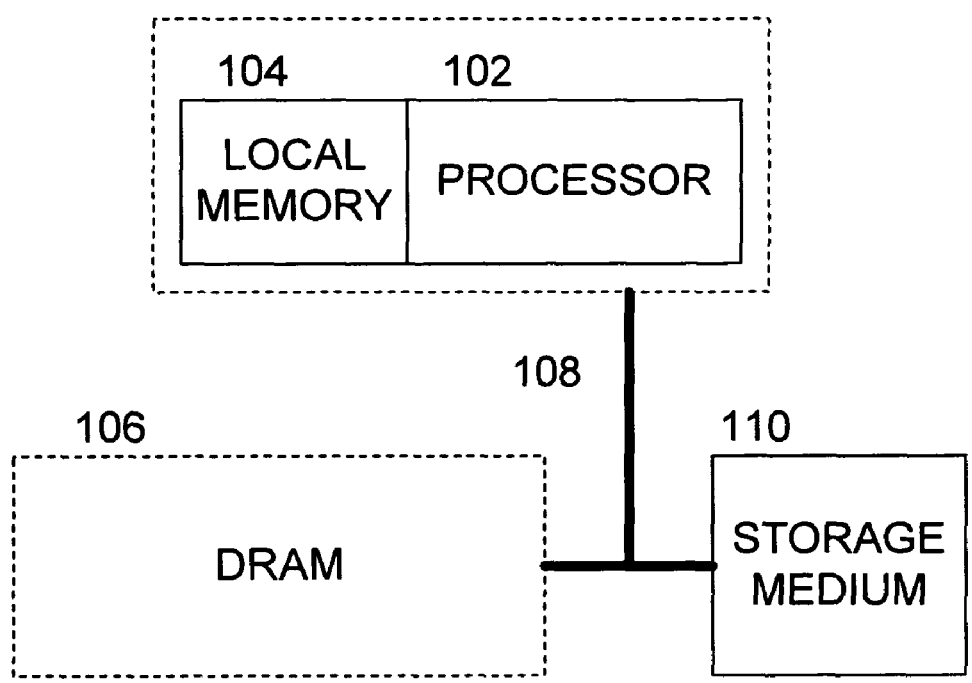
FIG. 1 is a diagram illustrating a processing system in accordance with one or more aspects of the present invention.

With reference to the drawings, wherein like numerals indicate like elements, there is shown in FIG. 1 a processing system 100 suitable for employing one or more aspects of the present invention. For the purposes of brevity and clarity, the block diagram of FIG. 1 will be referred to and described herein as illustrating an apparatus 100, it being understood, however, that the description may readily be applied to various aspects of a method with equal force. The apparatus 100 preferably includes a processor 102, a local memory 104, a system memory 106 (e.g., a DRAM), and a bus 108.

The processor 102 may be implemented utilizing any of the known technologies that are capable of requesting data from the system memory 106, and manipulating the data to achieve a desirable result. For example, the processor 102 may be implemented using any of the known microprocessors that are capable of executing software and/or firmware, including standard microprocessors, distributed microprocessors, etc. By way of example, the processor 102 may be a graphics processor that is capable of requesting and manipulating data, such as pixel data, including gray scale information, color information, texture data, polygonal information, video frame information, etc.

Notably, the local memory 104 is preferably located in the same chip as the processor 102; however, the local memory 104 is preferably not a hardware cache memory in that there are preferably no on chip or off chip hardware cache circuits, cache registers, cache memory controllers, etc. to implement a hardware cache memory function. In alternative embodiments, the local memory 104 may be a cache memory and/or an additional cache memory may be employed. As on chip space is often limited, the size of the local memory 104 may be much smaller than the system memory 106. The processor 102 preferably provides data access requests to copy data (which may include program data) from the system memory 106 over the bus 108 into the local memory 104 for program execution and data manipulation. The mechanism for facilitating data access may be implemented utilizing any of the known techniques, such as direct memory access (DMA) techniques.

The apparatus 100 also preferably includes a storage medium, such as a read only memory (ROM) that is operatively coupled to the processor 102, e.g., through the bus 108. The storage medium 110 preferably contains a trusted decryption program that is readable into the local memory 104 of the processor 102 and operable to decrypt information using a secure decryption key. Preferably, the storage medium 110 is a permanently programmable device (e.g., a flash ROM) a level of security is achieved in which the decryption program yields a trusted function and cannot be tampered with by external software manipulation. The security of the storage medium 110 is preferably such that the decryption program and/or other information (such as a trusted decryption key) may not be accessed by unauthorized entities. For example, the decryption program is preferably established and stored in the storage medium 110 during the manufacture of the apparatus 100.

It is preferred that the processor 102 and the local memory 104, are disposed on a common integrated circuit. Thus, these elements may be referred to herein as "the processor 102." In an alternative embodiment, the storage medium 110 may also be disposed on the common integrated circuit with one or more of the other elements.

Figure 2:
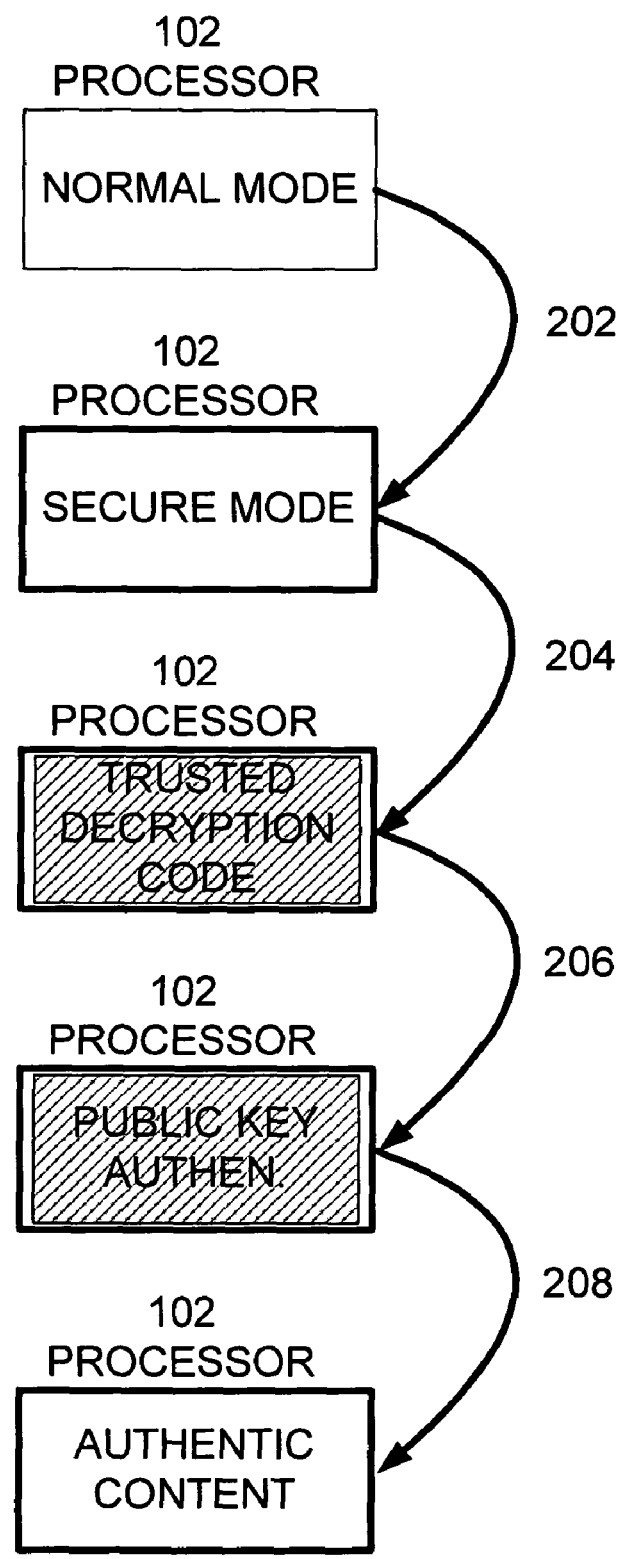
FIG. 2 is a flow diagram illustrating functional transitions of the processing system of FIG. 1 in accordance with one or more aspects of the present invention.

Reference is now made to both FIGS. 1 and 2, where in general the processor 102 is operable to change status in order to achieve various conditional states. These states will be briefly introduced and then discussed in more detail hereinbelow. In a first state, the processor 102 is in a normal mode. The processor 102 is preferably operable to transition (action 202) to a second state, where the processor 102 is in a secure mode of operation. The processor 102 is also preferably operable to transition (action 204) to a third state in which trusted decryption code may be invoked and executed within the processor 102. As will be discussed in more detail herein below, the decryption code may be utilized to invoke further functionality, such as an authentication program, by transitioning (action 206) to a fourth state in which the authentication program is invoked. It is noted that the transition of action 206 changes the functionality of the processor from the decryption program to the authentication program. The authentication program may be utilized to validate content prior to its execution by the processor 102. In this regard, the processor 102 is preferably operable to transition (action 208) to a fifth state in which the functionality of the authentication program is discarded in favor of executing the content.

Figure 3:
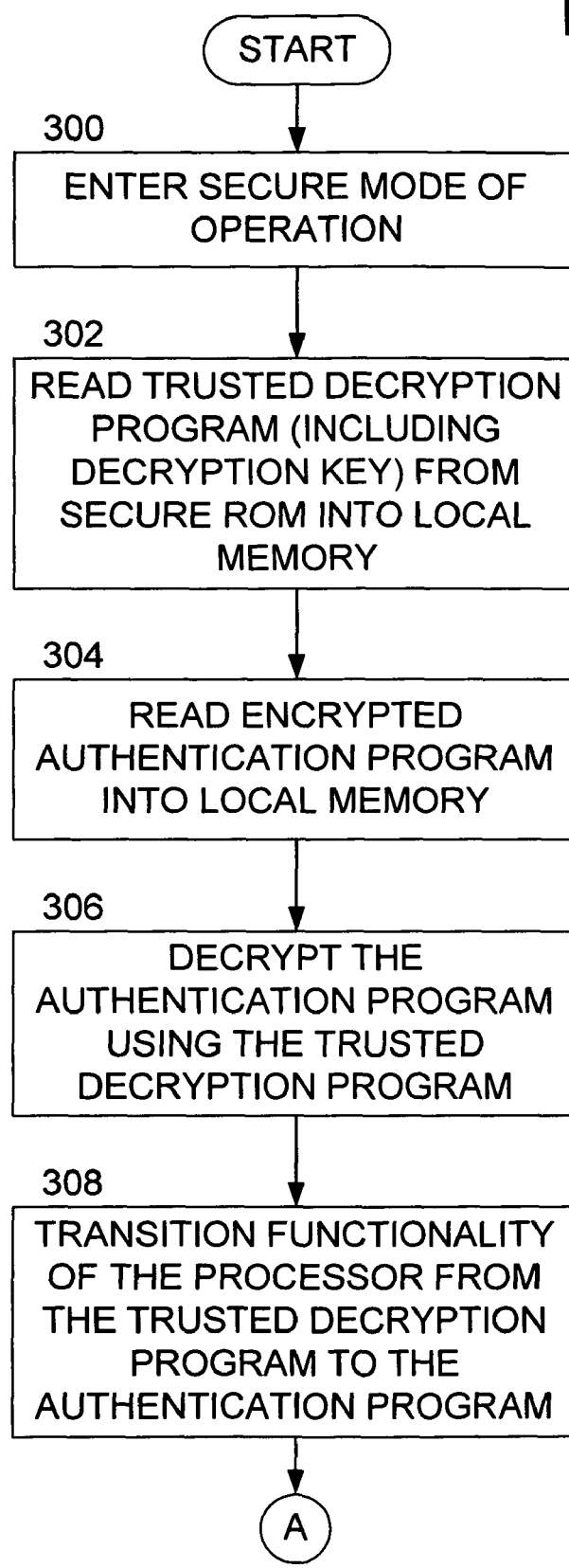
FIG. 3 is a flow diagram illustrating process steps that may be carried out by the processing system of FIG. 1 in accordance with one or more further aspects of the present invention.

Further details regarding the transitions of the processor 102 to the various states will be discussed in more detail herein with reference to FIGS. 3 and 4, which are flow diagrams illustrating process steps that may be carried out by the apparatus 100 in accordance with one or more aspect of the present invention. At action 300, the processor 102 is preferably operable to enter a secure mode of operation. In this secure mode of operation, no requests for data stored in the local memory 104 (or any other memory devices, registers, etc.) of the processor 102 will be serviced, thereby insuring a trusted environment in which to carry out sensitive operations. Despite being in a secure mode, the processor 102 may request the transfer of data from the system memory 106 into the local memory 104, or may request the transfer of data from the local memory 104 to the system memory 106. Still further, the processor 102 may initiate the transfer of data into and out of the trusted environment irrespective of the source or destination while in the secure mode of operation.

Once the trusted environment provided by the secure mode of operation is achieved, the processor 102 is preferably operable to read the decryption program from the storage medium 110 into the local memory 104. Preferably, a trusted decryption key is also stored within the storage medium 110 and is read into the local memory 104 for later use. At action 304, an encrypted authentication program is preferably read into the local memory 104 of the processor 102. As the authentication program is preferably encrypted, it may be stored in a less secure storage medium, such as the system memory 106. Thus, the action of reading the encrypted authentication program into the local memory 104 preferably entails obtaining the encrypted authentication program from the system memory 106.

At action 306, the encrypted authentication program is preferably decrypted using the decryption program and the trusted decryption key. This action assumes that the authentication program was encrypted utilizing a key that is associated with the trusted decryption key. As the decryption of the authentication program takes place within the trusted environment of the secure processor 102, it may be assumed that the authentication program cannot be tampered with after decryption. Therefore, at action 308 the functionality of the processor may be transitioned from the decryption program to the authentication program.

In an alternative embodiment of the invention, the authenticity of the authentication program may be verified prior to transitioning functionality of the processor 102. In this regard, the step of verifying the authenticity of the authentication program may include executing a hash function on the decrypted authentication program to produce a hash result. Thereafter, the hash result may be compared with a predetermined hash value, which may be a digital signature or the like. By way of example, the hash function may be executed on the authentication program by a trusted entity to produce the predetermined hash value. The predetermined hash value may be encrypted with the authentication program itself and provided by the trusted entity to the system memory 106. Those skilled in the art will appreciate that one or more intervening entities may be employed to complete the transmission of the encrypted authentication program from the trusted entity to the system memory 106.

As discussed above, the decryption program is preferably established and stored in the storage medium 110 during manufacture of the apparatus 100. Thus, the decryption program may include the ability to execute the same hash function that was used by the trusted entity to produce the predetermined hash value. The decryption program may be operable to execute the hash function on the authentication program to produce the hash result and to compare the hash result with the predetermined hash value. If the hash result and the predetermined hash value match, then it may be assumed that the authentication program has not been tampered with and is authentic.

Figure 4:
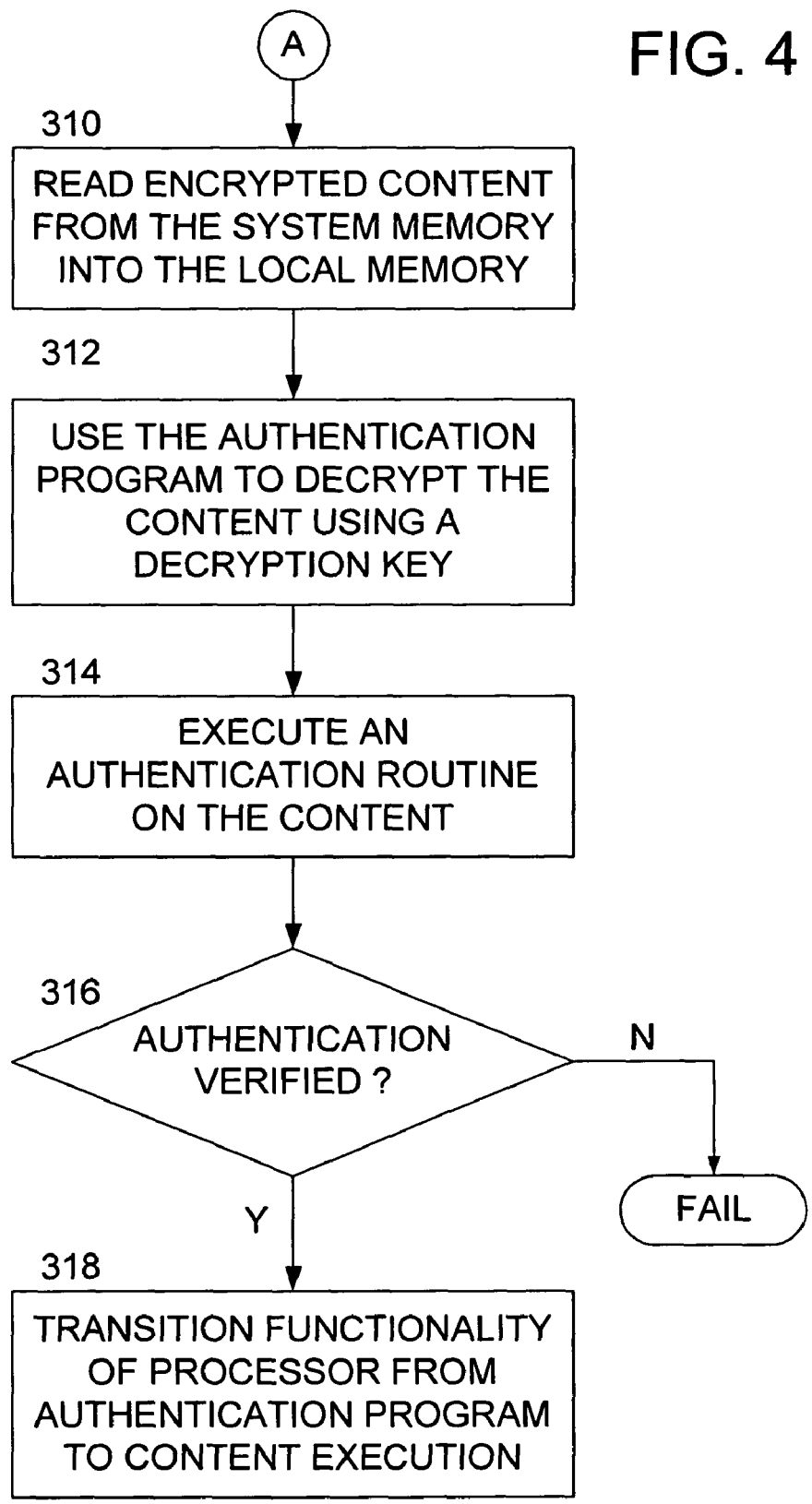
FIG. 4 is a flow diagram illustrating further process steps that may be carried out by the processing system of FIG. 1 in accordance with one or more further aspects of the present invention.

With reference to FIG. 4, once the functionality of the processor 102 has transitioned to the authentication program, encrypted content is preferably read into the local memory 104 of the processor 102 (action 310). As the content is encrypted, it may be stored in a relatively un-secure location, such as the system memory 106. It is preferred that the content has been encrypted using a private key of a private/public key pair. Thus, no unauthorized entity can decrypt the content without having the public key of the pair. At action 312, the authentication program is preferably privy to the public key of the private/public key pair and is operable to decrypt the encrypted content using such key.

At action 314, an authentication routine is preferably executed on the decrypted content. The authentication routine preferably verifies the authenticity of the content prior to its execution by the processor 102. In this regard, the step of verifying the authenticity of the content may include executing a hash function on the decrypted content to produce a hash result. Thereafter, the hash result may be compared with a predetermined hash value, which may be a digital signature or the like. By way of example, the hash function may be executed on the content by a trusted entity to produce the predetermined hash value. The predetermined hash value may be encrypted with the content itself and provided by the trusted entity to the system memory 106. Again, those skilled in the art will appreciate that one or more intervening entities may be employed to complete the transmission of the encrypted content from the trusted entity to the system memory 106.

The authentication program may include the ability to execute the same hash function that was used by the trusted entity to produce the predetermined hash value for the content. The authentication program may be operable to execute the hash function on the content to produce the hash result and to compare the hash result with the predetermined hash value. If the hash result and the predetermined hash value match, then it may be assumed that the content has not been tampered with and is authentic.

At action 316, a determination is preferably made as to whether the content is authentic. If the result of the determination is negative, then the process flow preferably advances to a failed state where appropriate actions are taken. For example, the authentication process may be retried, a message may be delivered to an operator of the apparatus 100 indicating the failure to authenticate the content, or other such actions may be taken. If the result of the determination at action 316 is in the affirmative, then the process flow preferably advances to action 318, where the functionality of the processor 102 is preferably transitioned from the authentication program to content execution. In particular, the processor 102 is preferably operable to execute the content, which may be an application program, some data, etc.

Figure 5:
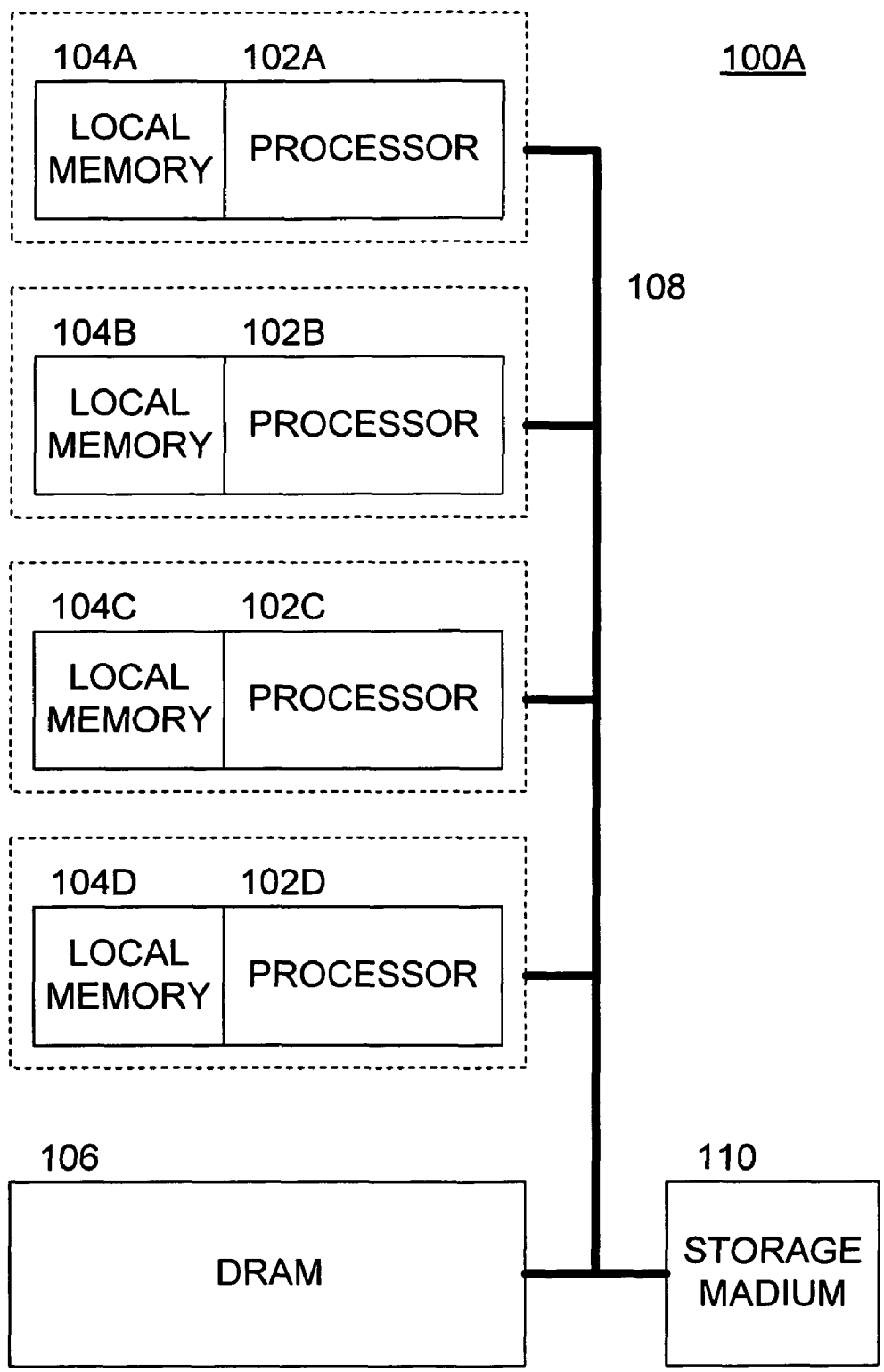
FIG. 5 is a diagram illustrating the structure of a multi-processing system having two or more sub-processors, one or more of which may include a processor having the capabilities of the processor of FIG. 1 in accordance with one or more further aspects of the present invention.

FIG. 5 is a diagram illustrating the structure of a multi-processing system 100A having two or more sub-processors 102. The concepts discussed hereinabove with respect to FIGS. 1-4 may be applied to the multi-processing system 100A, which includes a plurality of processors 102A-D, associated local memories 104A-D, and a main memory 106. At least the processors 102, the local memories 104, and the shared memory 106 are preferably (directly or indirectly) coupled to one another over a bus system 108 that is operable to transfer data to and from each component in accordance with suitable protocols. Although four processors 102 are illustrated by way of example, any number may be utilized without departing from the spirit and scope of the present invention. The processors 102 may be implemented with any of the known technologies, and each processor may be of similar construction or of differing construction.

One or more of the processors 102 preferably includes the capabilities and elements of the processor 102 of FIG. 1. Others of the processors 102 need not include such capabilities, although having such capabilities would not depart from the spirit and scope of the present invention. Each of the processors 102 may be of similar construction or of differing construction. The processors may be implemented utilizing any of the known technologies that are capable of requesting data from the shared (or system) memory 106, and manipulating the data to achieve a desirable result. For example, the processors 102 may be implemented using any of the known microprocessors that are capable of executing software and/or firmware, including standard microprocessors, distributed microprocessors, etc. By way of example, one or more of the processors 102 may be a graphics processor that is capable of requesting and manipulating data, such as pixel data, including gray scale information, color information, texture data, polygonal information, video frame information, etc.

One or more of the processors 102 of the system 100 may take on the role as a main (or managing) processor. The main processor may schedule and orchestrate the processing of data by the other processors.

The system memory 106 is preferably a dynamic random access memory (DRAM) coupled to the processors 102 through a memory interface circuit (not shown). Although the system memory 106 is preferably a DRAM, the memory 106 may be implemented using other means, e.g., a static random access memory (SRAM), a magnetic random access memory (MRAM), an optical memory, a holographic memory, etc.

Each processor 102 preferably includes a processor core and an associated one of the local memories 104 in which to execute programs. These components may be integrally disposed on a common semi-conductor substrate or may be separately disposed as may be desired by a designer. The processor core is preferably implemented using a processing pipeline, in which logic instructions are processed in a pipelined fashion. Although the pipeline may be divided into any number of stages at which instructions are processed, the pipeline generally comprises fetching one or more instructions, decoding the instructions, checking for dependencies among the instructions, issuing the instructions, and executing the instructions. In this regard, the processor core may include an instruction buffer, instruction decode circuitry, dependency check circuitry, instruction issue circuitry, and execution stages.

Each local memory 104 is coupled to its associated processor core 102 via a bus and is preferably located on the same chip (same semiconductor substrate) as the processor core. The local memory 104 is preferably not a traditional hardware cache memory in that there are no on-chip or off-chip hardware cache circuits, cache registers, cache memory controllers, etc. to implement a hardware cache memory function. As on chip space is often limited, the size of the local memory may be much smaller than the shared memory 106.

The processors 102 preferably provide data access requests to copy data (which may include program data) from the system memory 106 over the bus system 108 into their respective local memories 104 for program execution and data manipulation. The mechanism for facilitating data access may be implemented utilizing any of the known techniques, for example the direct memory access (DMA) technique. This function is preferably carried out by the memory interface circuit.

In accordance with one or more further aspects of the present invention, the transition of functionality to the decryption program to the authentication program in the processor 102 may take place as between two or more of the processors 102 in the multiprocessor system 10A. In particular, after the authentication program is decrypted using the decryption program (action 306, FIG. 3), the authentication program may be transferred from the secure processor in which the authentication program was decrypted to another of the processors 102 of the system 100A. It is noted that the processor 102 receiving the authentication program need not be in a secure mode of operation because the authentication program was decrypted (and possibly verified) within a trusted environment and, therefore, the transfer for such authentication program to another processor that is not in a secure mode of operation may still provide a level of confidence that the authentication program may be utilized to decrypt and authenticate content. Thus, actions 310-318 of FIG. 4 may also be carried out in connection with the multi-processor system 100A of FIG. 5.

In accordance with at least one further aspect of the present invention, the methods and apparatus described above may be achieved utilizing suitable hardware, such as that illustrated in the figures. Such hardware may be implemented utilizing any of the known technologies, such as standard digital circuitry, any of the known processors that are operable to execute software and/or firmware programs, one or more programmable digital devices or systems, such as programmable read only memories (PROMs), programmable array logic devices (PALs), etc. Furthermore, although the apparatus illustrated in the figures are shown as being partitioned into certain functional blocks, such blocks may be implemented by way of separate circuitry and/or combined into one or more functional units. Still further, the various aspects of the invention may be implemented by way of software and/or firmware program(s) that may be stored on suitable storage medium or media (such as floppy disk(s), memory chip(s), etc.) for transportability and/or distribution.

As discussed above, trusted decryption code (and a trusted decryption key) is stored in a secure memory that is associated with a particular processor. Once the trusted decryption code is invoked, it may be used to decrypt a public key authentication program (which was encrypted using the trusted key) and stored in a system memory. The public key authentication program may be used to decrypt and authenticate other application programs and content. Once the trusted decryption code has served it purpose, the function of the secure processor preferably transitions to the public key authentication program. In an alternative embodiment, the secure processor may pass the authenticated application program and/or data to another processor (which may or may not be secure) in a multi-processor system.

Advantageously, various aspects of the methods and apparatus of the present invention provide may be used to achieve useful results. For example, once the data have been decrypted and verified, the secure processor may execute and/or otherwise utilize the data in a secure fashion without concern about hacking or other security violations. Without such verification, however, any subsequent program execution and/or data manipulation cannot be fully trusted.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. In a processor and associated local memory capable of being operatively coupled to a main memory such that data may be read from the main memory for use in the local memory, a method, comprising:
   entering a secure mode of operation where externally initiated requests to read data from or write data into the processor are not serviced but internally initiated data transfers are serviced;
   reading a decryption program and an associated trusted decryption key from a storage medium into the local memory of the processor, wherein decryption program comprises trusted decryption code;
   reading an encrypted authentication program into the local memory of the processor;
   decrypting the encrypted authentication program using the decryption program;
   transitioning functionality of the processor from the decryption program to the authentication program;
   reading encrypted content from the system memory into the local memory, the content having been encrypted using a private key of a private/public key pair;
   decrypting the encrypted content using the authentication program and the public key of the private/public key pair; and
   authenticating the content using the authentication program.

2. The method of claim 1, wherein the storage medium containing the decryption program is secure such that the decryption program may not be tampered with by external software manipulation.

3. The method of claim 1, further comprising verifying the authenticity of the authentication program prior to transitioning functionality of the processor.

4. The method of claim 3, wherein the step of verifying the authenticity of the authentication program includes executing a hash function on the decrypted authentication program to produce a hash result and comparing the hash result with a predetermined hash value.

5. The method of claim 1, further comprising verifying the authenticity of the content by executing a hash function thereon to produce a hash result and comparing the hash result with a predetermined hash value.

6. The method of claim 5, further comprising transitioning functionality of the processor from the authentication program to the content if the content is authentic.

7. In a multi-processing system in which at least one processor has an associated local memory that is capable of being operatively coupled to a main memory such that data may be read from the main memory for use in the local memory, a method, comprising:
   entering a secure mode of operation where externally initiated requests to read data from or write data into the at least one processor are not serviced but internally initiated data transfers are serviced;
   reading a decryption program and an associated trusted decryption key from a storage medium into the local memory of the at least one processor, wherein decryption program comprises trusted decryption code;
   reading an encrypted authentication program into the local memory of the at least one processor;
   decrypting the encrypted authentication program using the decryption program;
   transferring the authentication program from the at least one processor to another processor of the system;
   reading encrypted content from the system memory into the local memory, the content having been encrypted using a private key of a private/public key pair;
   decrypting the encrypted content using the authentication program and the public key of the private/public key pair; and
   authenticating the content using the authentication program.

8. The method of claim 7, further comprising receiving encrypted content into a local memory of the other processor, the content having been encrypted using a private key of a private/public key pair; and
   using the authentication program to authenticate the content.

9. The method of claim 8, further comprising decrypting the encrypted content using the authentication program and the public key of the private/public key pair.

10. The method of claim 9, further comprising verifying the authenticity of the content by executing a hash function thereon to produce a hash result and comparing the hash result with a predetermined hash value.

11. The method of claim 10, further comprising transitioning functionality of the other processor from the authentication program to the content if the content is authentic.

12. An apparatus, comprising:
   at least one processor and associated local memory capable of being operatively coupled to a main memory and being operable to request at least some data from the main memory for use in the local memory; and
   a storage medium containing a decryption program,
   wherein the processor is operable to:
   enter a secure mode of operation where externally initiated requests to read data from or write data into the processor are not serviced but internally initiated data transfers are serviced;
   read a decryption program and an associated trusted decryption key from a storage medium into the local memory of the processor, wherein decryption program comprises trusted decryption code;
   read an encrypted authentication program into the local memory of the processor;
   decrypt the encrypted authentication program using the decryption program; and
   transition functionality from the decryption program to the authentication program;

read encrypted content from the system memory into the local memory, the content having been encrypted using a private key of a private/public key pair;

decrypt the encrypted content using the authentication program and the public key of the private/public key pair; and authenticate the content using the authentication program.

13. The apparatus of claim 12, wherein the storage medium containing the decryption program is secure such that the decryption program may not be tampered with by external software manipulation.

14. The apparatus of claim 12, wherein the processor is further operable to verify the authenticity of the authentication program prior to transitioning functionality.

15. The apparatus of claim 14, wherein the processor is operable to execute a hash function on the decrypted authentication program to produce a hash result and compare the hash result with a predetermined hash value to verify the authenticity of the authentication program includes.

16. The apparatus of claim 12, wherein the processor is further operable to verify the authenticity of the content by executing a hash function thereon to produce a hash result and comparing the hash result with a predetermined hash value.

17. The method of claim 16, wherein the processor is further operable to transition functionality from the authentication program to the content if the content is authentic.

18. An apparatus, comprising:
a plurality of processors, at least one processor having an associated local memory capable of being operatively coupled to a main memory and being operable to request at least some data from the main memory for use in the local memory; and
a storage medium containing a decryption program, wherein the at least one processor is operable to:
enter a secure mode of operation where externally initiated requests to read data from or write data into the processor are not serviced but internally initiated data transfers are serviced;
read a decryption program and an associated trusted decryption key from a storage medium into the local memory of the processor, wherein decryption program comprises trusted decryption code;
read an encrypted authentication program into the local memory of the processor;
decrypt the encrypted authentication program using the decryption program; and
transfer the authentication program to another processor of the system;
reading encrypted content from the system memory into the local memory, the content having been encrypted using a private key of a private/public key pair;
decrypting the encrypted content using the authentication program and the public key of the private/public key pair; and
authenticating the content using the authentication program.

19. The apparatus of claim 18, wherein the other processor is operable to:
receive encrypted content into a local memory thereof, the content having been encrypted using a private key of a private/public key pair; and
use the authentication program to authenticate the content.

20. The apparatus of claim 19, wherein the other processor is operable to decrypt the encrypted content using the authentication program and the public key of the private/public key pair.

21. The apparatus of claim 20, wherein the other processor is operable to verify the authenticity of the content by executing a hash function thereon to produce a hash result and comparing the hash result with a predetermined hash value.

22. The apparatus of claim 21, wherein the other processor is operable to transition functionality of the other processor from the authentication program to the content if the content is authentic.

23. A computer-readable, non-transitory storage device containing at least one software program capable of causing a processing system to carry out actions, the processing system including at least one processor and associated local memory capable of being operatively coupled to a main memory such that data may be read from the main memory for use in the local memory, the actions comprising:
entering a secure mode of operation where externally initiated requests to read data from or write data into the processor are not serviced but internally initiated data transfers are serviced;
reading a decryption program and an associated trusted decryption key from a storage medium into the local memory of the processor, wherein decryption program comprises trusted decryption code;
reading an encrypted authentication program into the local memory of the processor;
decrypting the encrypted authentication program using the decryption program; and
transitioning functionality of the processor from the decryption program to the authentication program;
reading encrypted content from the system memory into the local memory, the content having been encrypted using a private key of a private/public key pair;
decrypting the encrypted content using the authentication program and the public key of the private/public key pair; and
authenticating the content using the authentication program.

24. The storage device of claim 23, wherein the storage medium containing the decryption program is secure such that the decryption program may not be tampered with by external software manipulation.

25. The storage device of claim 23, further comprising verifying the authenticity of the authentication program prior to transitioning functionality of the processor.

26. The storage device of claim 25, wherein the step of verifying the authenticity of the authentication program includes executing a hash function on the decrypted authentication program to produce a hash result and comparing the hash result with a predetermined hash value.

27. The storage device of claim 23, further comprising verifying the authenticity of the content by executing a hash function thereon to produce a hash result and comparing the hash result with a predetermined hash value.

28. The storage device of claim 27, further comprising transitioning functionality of the processor from the authentication program to the content if the content is authentic.

29. The storage device of claim 23, wherein:
the processing system is a multi-processing system in which at least one processor has an associated local memory being operatively coupled to a main memory such that data may be read from the main memory for use in the local memory; and
the actions further comprise transferring the authentication program from the at least one processor to another processor of the system.

30. The storage device of claim 29, further comprising receiving encrypted content into a local memory of the other processor, the content having been encrypted using a private key of a private/public key pair; and using the authentication program to authenticate the content.

31. The storage device of claim 30, further comprising decrypting the encrypted content using the authentication program and the public key of the private/public key pair.

32. The storage device of claim 31, further comprising verifying the authenticity of the content by executing a hash function thereon to produce a hash result and comparing the hash result with a predetermined hash value.

33. The storage device of claim 32, further comprising transitioning functionality of the other processor from the authentication program to the content if the content is authentic.

* * * * *